Dec. 13, 1955  V. SOSKICE  2,726,474
FLOATS FOR FISHLINES
Filed March 26, 1951
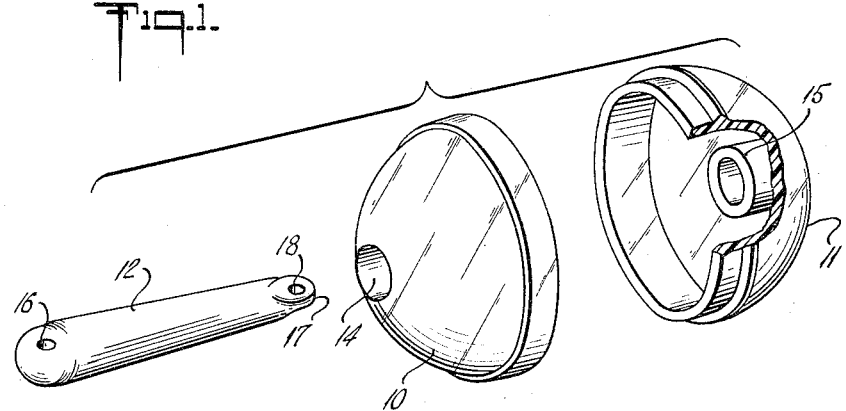
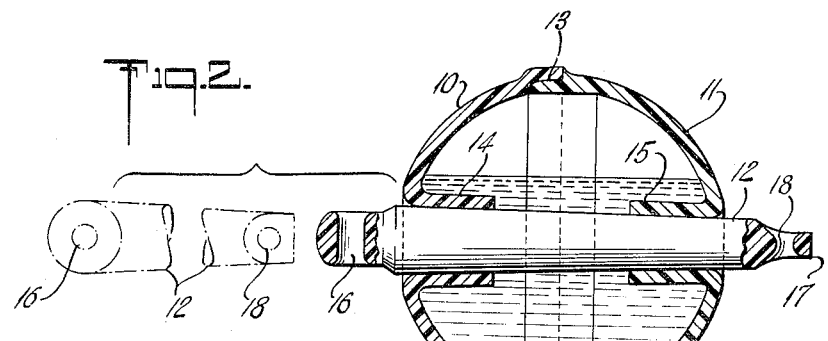
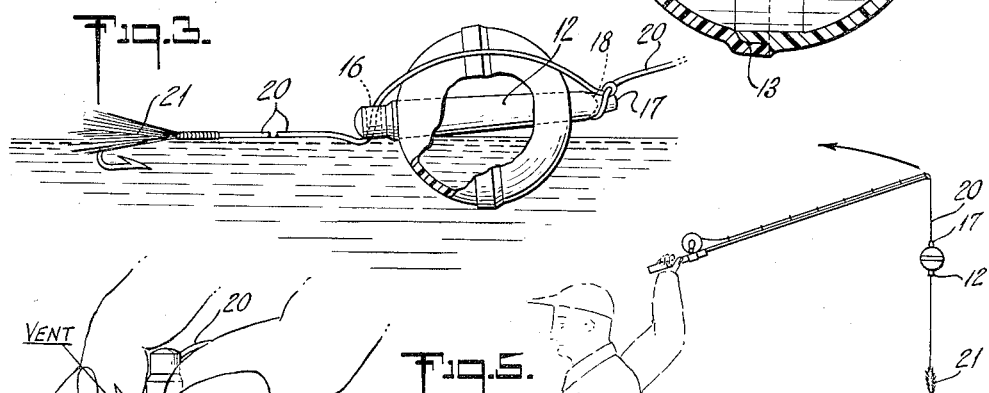
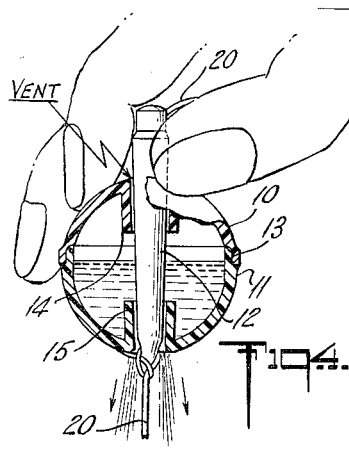
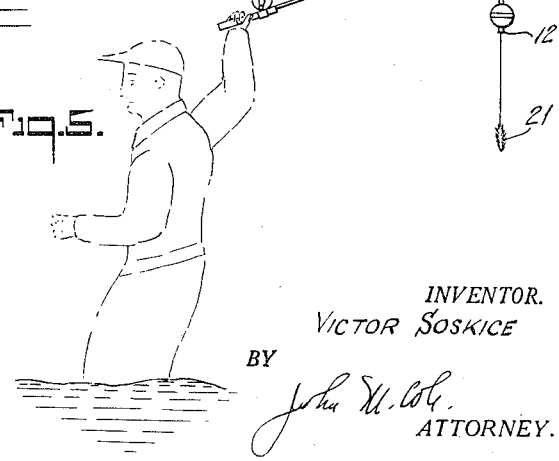
INVENTOR.
VICTOR SOSKICE
BY
ATTORNEY.

United States Patent Office 2,726,474
Patented Dec. 13, 1955

2,726,474

FLOATS FOR FISHLINES

Victor Soskice, New York, N. Y., assignor to Airex Manufacturing Co., Inc., New York, N. Y., a corporation of New York Application March 26, 1951, Serial No. 217,656

5 Claims. (Cl. 43—43.14)

The present invention relates to floats adapted for use in casting a fishline.

In dry fly fishing as ordinarily carried out, the fisherman whips the rod so as to get the line in the air and free from the rod, and the placing of the substantially weightless lure on the water is accomplished without any weight added to the line.

In bait casting on the other hand, sufficient weight is carried at or near the end of the line to draw the line off the reel in a single swing of the rod and carry out the lure.

The present invention relates to floats adapted for use with dry flies, which makes is possible to provide the line with sufficient load or weight to carry the line from the short bait casting rod to the desired location and use a substantially weightless lure. At the same time, the float is so designed as to facilitate varying the weight of the float, yet keep it buoyant at all times, so that the float does not sink.

According to the present invention, the float is so made that it can be readily secured to the line in any adjusted position relative to the lure and can be partially filled with water in varying amounts to vary the weight and buoyancy, all without making it necessary, once the float has been secured on the line, to remove the float or the lure from the line. The construction is such that there is nothing to become disengaged or lost in use.

The accompanying drawings show, for purposes of illustrating the present invention, one embodiment in which the invention may take form, it being understood that the drawings are illustrative of the invention rather than limiting the same.

In the accompanying drawings:

Figure 1 is an exploded perspective view illustrating the float parts;

Figure 2 is a longitudinal sectional view through the completed float, the parts being shown in full lines in normal position;

Figure 3 is an elevational view with parts broken away, showing the float attached to a fishline;

Figure 4 is a sectional view corresponding to Fig. 2 showing the manner in which the buoyancy of the float may be changed by varying the amount of water in it; and Figure 5 is a view illustrating the float in use on a bait casting line.

As shown in the drawings, the float has a thin-walled hollow float body made of two plastic molded hemispherical halves 10 and 11, and a pin or plug 12 preferably tapered. These are preferably made of transparent material such as cellulose acetate butyrate, so that the completed float, when in use, will look like a floating bubble on the water.

The parts 10 and 11 telescope one another as indicated at 13 and are cemented together. The parts 10 and 11 each preferably have inwardly extending tubular elements 14 and 15, in which are provided relatively long tapered holes to fit the tapered pin 12. The larger end of the pin 12 is provided with a hole indicated at 16.

The smaller end of the pin is made of reduced thickness as indicated at 17 and provided with a hole 18.

Owing to the length of the tubular members 14 and 15, there will always be an annular air pocket or chamber about the upper tube which will not fill with liquid. It is thus possible in the design of the float to make certain that the float will always have buoyancy and not sink due to its own weight or contained water.

In use, the retrieving end 20 of the line is passed through the line-receiving hole 18 and secured to the line by means of a half-hitch or other knot formed in the line, after which the line is passed outside of the float body and then through the line-receiving hole 16 in the larger end of the pin. At the end, the line is connected in any suitable manner, not shown, with a lure 21 such as a dry fly.

The tension from the retrieving end of the line is always applied to the small end of the plug so that it is pulled back into the float body so as to keep it in the position shown in Figures 2 and 3 of the drawings. When one wishes to vary the buoyancy of the float, the plug is manually forced in the opposite direction back into the float. The line doubles about the thin end of the plug and may be pulled into the float, if desired. Liquid can then pass in or out through one of the tubular members 14 or 15 while air passes out or in through the other. Inasmuch as the float body can be readily released from the pin and slipped along the line, it is possible to shift the float position or to change the amount of water in the float without taking it apart. There are no loose pieces which can become lost once the float has been secured to the line. The tapered pin fits sufficiently tightly to always remain with the float body while the float is in the tackle box.

While in the drawings the float is made round to simulate a bubble, this is merely a preferred configuration. Except for appearance, the float could have varying configuration. The float may also be used as a bobber.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. An ever buoyant fishline float comprising a thin walled shell having two aligned, inwardly extending tubular elements with their inner ends open and spaced to provide openings to the interior of the shell and pocketing air so as to prevent completely filling the float with liquid, and a plug member reciprocable in the tubular elements, the plug member when withdrawn allowing the passage of liquid into and out of the shell and when in position to close both openings preventing flow of liquid in either direction.

2. An ever buoyant fishline float as claimed in claim 1, wherein the plug has protruding ends provided with holes to accommodate fishline.

3. An ever buoyant fishline float as claimed in claim 1, wherein the plug is in the form of a tapered pin and the tubular openings are correspondingly tapered.

4. An ever buoyant fishline float as claimed in claim 1, wherein the plug is in the form of a tapered pin and has protruding ends provided with line receiving holes, and the tubular openings are tapered to fit the plug.

5. A float comprising a transparent hollow body having aligned openings in communication with the hollow portion of the body, one of the openings having a wall which for a substantial portion of its length is in such relation to an adjacent wall portion of the body as to define therewith an annular chamber, the openings being of different cross sectional area, and a tapered plug adapted to extend through said openings and have a close fitting relation with the inner wall surfaces thereof, the inner ends of said openings being spaced from each other, said plug having line-receiving holes at the outer ends thereof whereby a line may be extended through said holes and associated therewith in such a manner that manipulation of the line will cause the plug to be seated in the openings and whereby manual force on the plug in the opposite direction will shift the plug relative to the body to permit the flow of water to and from the hollow portion of the body.

References Cited in the file of this patent

UNITED STATES PATENTS

| Number | Name | Date |
|---|---|---|
| 458,129 | Papin | Aug. 18, 1891 |
| 668,254 | Dickinson | Feb. 19, 1901 |
| 1,579,111 | Hinkson | Mar. 30, 1926 |
| 1,804,084 | Blake | May 5, 1931 |
| 1,850,748 | Foster | Mar. 22, 1932 |
| 2,379,676 | Blackstone | July 3, 1945 |
| 2,444,791 | Stahnke et al. | July 6, 1948 |
| 2,556,932 | Morrissey | June 12, 1951 |